(12) United States Patent
Yeh

(10) Patent No.: US 9,004,967 B2
(45) Date of Patent: *Apr. 14, 2015

(54) SKIDPROOF SPORTS MAT

(71) Applicant: Tzong In Yeh, Fremont, CA (US)

(72) Inventor: Tzong In Yeh, Fremont, CA (US)

(*) Notice: Subject to any disclaimer, the term of this patent is extended or adjusted under 35 U.S.C. 154(b) by 52 days.

This patent is subject to a terminal disclaimer.

(21) Appl. No.: 13/872,685

(22) Filed: Apr. 29, 2013

(65) Prior Publication Data

US 2013/0244015 A1  Sep. 19, 2013

Related U.S. Application Data

(63) Continuation of application No. 12/941,699, filed on Nov. 8, 2010, now Pat. No. 8,540,538, which is a continuation-in-part of application No. 12/370,405, filed on Feb. 12, 2009, now Pat. No. 7,850,498, which is a continuation-in-part of application No. 12/134,704, filed on Jun. 6, 2008, now Pat. No. 7,491,105, which is a continuation of application No. 10/797,094, filed on Mar. 11, 2004, now Pat. No. 6,988,920, which is a continuation-in-part of application No. 10/040,404, filed on Jan. 9, 2002, now abandoned, said application No. 12/370,405 is a continuation-in-part of application No. 12/222,470, filed on Aug. 11, 2008, now Pat. No. 7,976,933, which is a continuation-in-part of application No. 11/653,208, filed on Jan. 16, 2007, now abandoned.

(51) Int. Cl.

| | | |
|---|---|---|
| B63B 1/00 | (2006.01) |
| A63B 21/00 | (2006.01) |
| B63B 35/81 | (2006.01) |
| A63B 6/00 | (2006.01) |
| A63C 19/04 | (2006.01) |
| B32B 5/18 | (2006.01) |

(Continued)

(52) U.S. Cl.
CPC ... *A63B 21/00105* (2013.01); *Y10T 428/24504* (2015.01); *Y10T 428/24967* (2015.01); *Y10T 428/24802* (2015.01); *B63B 1/00* (2013.01); *B63B 35/81* (2013.01); *A63B 6/00* (2013.01); *A63B 21/1473* (2013.01); *A63C 19/04* (2013.01); *B29L 2031/52* (2013.01); *B32B 5/18* (2013.01); *B32B 25/08* (2013.01); *B32B 38/06* (2013.01); *B32B 38/145* (2013.01); *B32B 2305/022* (2013.01); *B32B 2307/744* (2013.01); *B32B 2471/04* (2013.01); *B63B 2231/50* (2013.01); *B32B 3/10* (2013.01)

(58) Field of Classification Search
CPC .................. B63B 2035/7903; B63B 35/7906; B63B 35/81; B63B 35/7909; B63B 35/7936; B63B 1/00
USPC ...................................................... 441/65, 74
See application file for complete search history.

(56) References Cited

U.S. PATENT DOCUMENTS

| | | |
|---|---|---|
| 3,007,205 A | 11/1961 | House |
| 3,016,317 A | 1/1962 | Brunner |

(Continued)

FOREIGN PATENT DOCUMENTS

| | | |
|---|---|---|
| DE | 2540036 A | 3/1977 |
| JP | 11266995 A | 10/1999 |
| TW | M251621 | 12/2004 |

*Primary Examiner* — Lars A Olson
(74) *Attorney, Agent, or Firm* — Muncy, Geissler, Olds & Lowe, P.C.

(57) ABSTRACT

A sports mat includes a foam sheet, an adhesive bonding film, a patterned layer and a skid proof layer. The foam sheet is made of polyethylene foam. The adhesive bonding film applied to a top surface of the foam sheet. The patterned layer has a plastic film and a pattern printed in a bottom surface of the plastic film. The plastic film together with the pattern is joined on top of the adhesive bonding film. The skid proof layer, made of thermal plastic rubber, is coated over a top surface of the plastic film. Additionally, the skid proof layer together with the patterned layer, the adhesive bonding film and the foam sheet defines a plurality of indentations and protrusions over a top surface of the skid proof layer so as to strengthen connection therebetween.

6 Claims, 5 Drawing Sheets

(51) Int. Cl.
  *B32B 25/08*   (2006.01)
  *B32B 3/10*   (2006.01)
  *B29L 31/52*   (2006.01)
  *B32B 38/06*   (2006.01)
  *B32B 38/00*   (2006.01)

(56) References Cited

U.S. PATENT DOCUMENTS

| | | |
|---|---|---|
| 4,147,828 A | 4/1979 | Heckel et al. |
| 4,457,729 A | 7/1984 | Peerlkamp |
| 4,752,260 A | 6/1988 | Stewart |
| 4,850,913 A | 7/1989 | Szabad, Jr. |
| 5,211,593 A | 5/1993 | Schneider et al. |
| 5,224,890 A | 7/1993 | Moran |
| 5,238,434 A | 8/1993 | Moran |
| 5,503,921 A | 4/1996 | Chang et al. |
| 5,558,551 A | 9/1996 | Irby |
| 5,618,215 A | 4/1997 | Glydon |
| 5,647,784 A | 7/1997 | Moran |
| 5,658,179 A | 8/1997 | Glydon et al. |
| 5,797,779 A | 8/1998 | Stewart |
| 5,928,045 A | 7/1999 | Szabad |
| 6,106,345 A | 8/2000 | Yeh |
| 6,109,991 A | 8/2000 | McClaskey |
| 6,785,921 B1 | 9/2004 | Conforti |
| 6,955,576 B2 | 10/2005 | Yeh |
| 6,988,920 B2 | 1/2006 | Yeh |
| 7,063,769 B2 | 6/2006 | Cheung |
| 7,083,486 B2 | 8/2006 | Yeh |
| 7,172,481 B2 | 2/2007 | Yeh |
| 7,246,568 B1 | 7/2007 | Cheung |
| 7,264,523 B2 | 9/2007 | Yeh |
| 7,326,094 B2 | 2/2008 | Yeh |
| 7,404,749 B2 | 7/2008 | Cheung |
| 7,416,461 B2 | 8/2008 | Yeh |
| 7,491,105 B2 | 2/2009 | Yeh |
| 7,850,498 B2 | 12/2010 | Yeh |
| 2004/0250346 A1 | 12/2004 | Vasishth |
| 2006/0116038 A1 | 6/2006 | Cheung |
| 2007/0020449 A1 | 1/2007 | Hing |
| 2007/0264891 A1 | 11/2007 | Cheung |
| 2008/0248701 A1 | 10/2008 | Yeh |

SKIDPROOF SPORTS MAT

CROSS REFERRENCE TO RELATED APPLICATION

This is a continuation application of U.S. application Ser. No. 12/941,699, filed on Nov. 8, 2010, which is a continuation-in-pan application of U.S. Pat. No. 7,850,498, filed on Feb. 12, 2009, which is a continuation-in-part of U.S. Pat. No. 7,491,105 filed on Jun. 6, 2008, which is a continuation of U.S. Pat. No. 6,988,920 filed on Mar. 11, 2004, which is a continuation-in-part of U.S. application Ser. No. 10/040,404 filed on Jan. 9, 2002, now abandoned. Besides, the U.S. Pat. No. 7,850,498, is also a continuation-in-part of U.S. Pat. No. 7,976,933, filed on Aug. 11, 2008, which is a continuation-in-part of U.S. application Ser. No. 11/653,208 filed on Jan. 16, 2007, now abandoned. Priority of all of the above-noted application is claimed under 35 U.S.C. §120, the entire contents of all of which are hereby incorporated by reference.

BACKGROUND OF INVENTION

1. Field of Invention

The present invention relates to a sports mat and in particular to a yoga mat.

2. Related Prior Art

Recently, exercise has gained popularity among people. Many people go to gyms for exercise. There is increasing need to choose a safe and comfortable sports mat. The sports mat protects a user's body from getting hurt while performing an exercise, such as Yoga, Pilates, push up or sit-up.

U.S. patent application No. 2004/0250346 discloses a skid-proof multi-layer yoga mat which includes an upper fabric layer, a lower pliable foam layer, and an intermediate adhesive such that during use the mat provides the athlete with safety and comfort and during transport or storage the rolled-up mat provides convenience.

However, the conventional sports mat is dull. This can't satisfy customers' desire for beauty. Nevertheless, the manufacturing process of the mats includes a plurality of steps, such as twisting, plunging and the like. The different colors of materials may be mixed up during the process so that a fresh colorful mat is still needed.

Hence, Taiwan Patent M251621, for example, discloses a yoga mat to enhance visual effects. The yoga mat comprises two transparent layers and a partly colored meshed laminate disposed in between the two transparent layers. The colors of the laminate are visible through the transparent layers. The visual effects are improved but to a limited extent.

What is desired, therefore, is a safe, comfortable and beautiful sports mat, which helps the athlete to enjoy exercising with a nice feeling.

SUMMARY OF INVENTION

It is an object of the present invention to provide a sports mat of controlled resilience and beautiful appearance. It is also an object of the present invention to provide a sports mat which possesses great flexibility and can be easily unrolled to be used and easily rolled up for being stored.

It is still another object of the present invention to provide a sports mat of great grip and skid resistance, and combined with good shock absorption.

It is yet another object of the present invention to provide a sports mat of great skid proof surface to prevent the user from slipping or tumbling.

With the above and other objects in view, the present invention mainly consists in a sports mat, comprising a foam sheet, an adhesive bonding film, a a patterned layer and a skid proof layer. The foam sheet is made of polyethylene foam and has a density in the range of 2 to 8 pcf and a thickness in the range of 2 to 8 mm. The adhesive bonding film is applied on a top surface of the foam sheet. The patterned layer has a plastic film and a pattern printed in a bottom surface of the plastic film. The plastic film together with the pattern is joined on top of the adhesive bonding film. The pattern is visible from outside of the sports mat.

The skid proof layer is coated over a top surface of the plastic film. Preferably, the skid proof layer is made of thermal plastic rubber. In particular, the skid proof layer together with the patterned layer and the adhesive bonding film and the foam sheet defines a plurality of indentations and protrusions over a top surface of the skid proof layer so as to strengthen connection therebetween.

In another embodiment, a sports mat is provided to include a foam sheet, a pattern, an adhesive bonding film and a skid proof layer. The foam sheet is made of polyethylene foam. The pattern is printed in a top surface of the foam sheet and visible from outside of the sports mat. The adhesive bonding film is applied on the top surface of the patterned foam sheet. The skid proof layer is applied on top of the adhesive bonding film and made of thermal plastic rubber. Additionally, the skid proof layer together with the adhesive bonding film and the foam sheet defines a plurality of indentations and protrusions over a top surface of the skid proof layer so as to strengthen connection therebetween.

Further benefits and advantages of the present invention will become clear as the description proceeds.

BRIEF DESCRIPTION OF DRAWINGS

The invention will now be elucidated by reference to the following description and accompanying drawings where.

DETAILED DESCRIPTION OF EMBODIMENTS

With reference to FIGS. 1 to 6, description will be given of a sports mat according to one embodiment of this invention.

Figure 1:
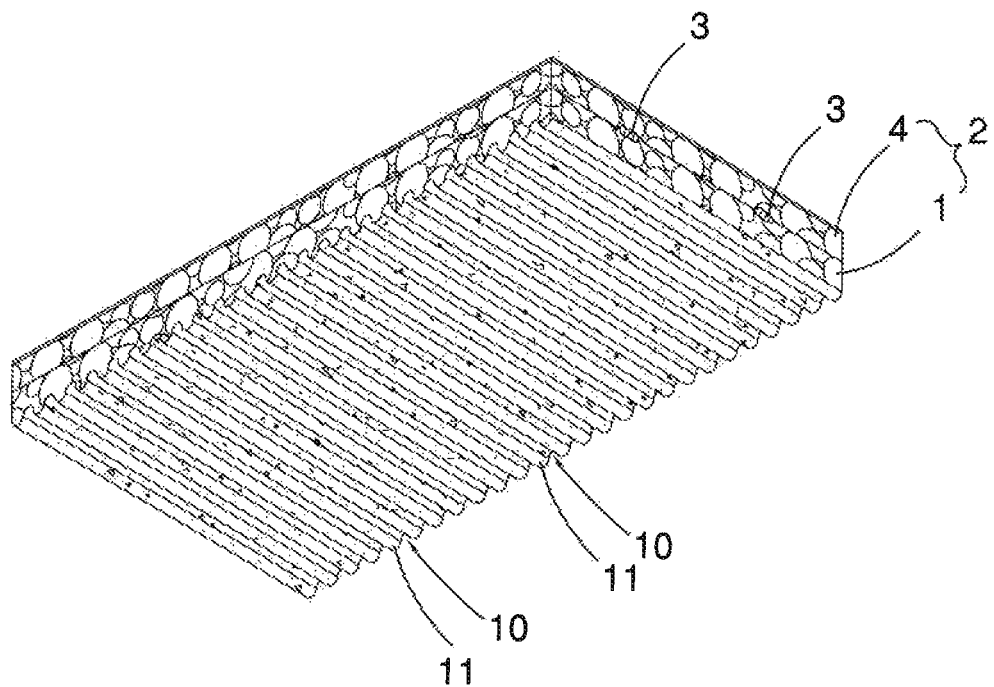
FIG. 1 is a perspective view of a sports mat according to one embodiment of the present invention.
Figure 3:
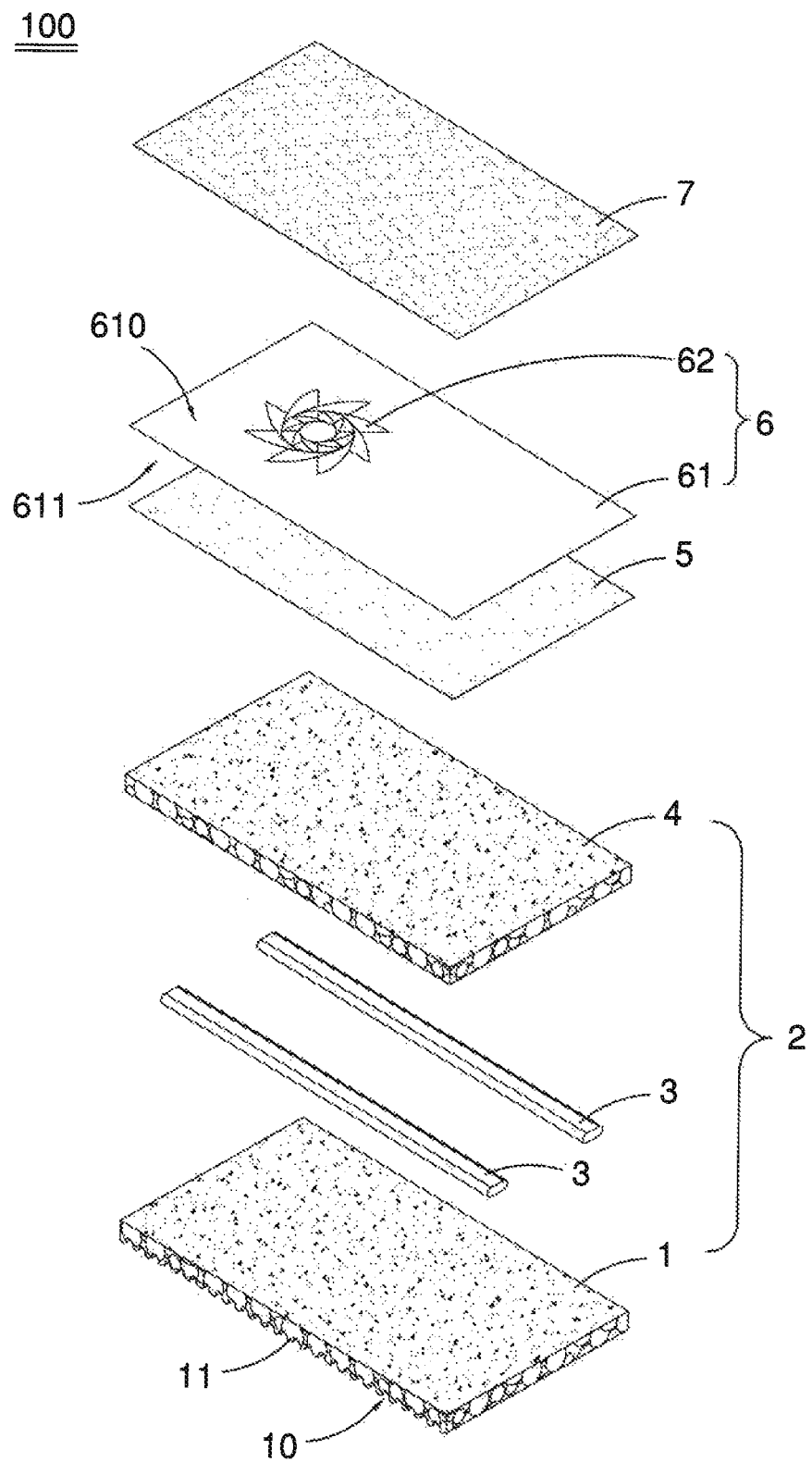
FIG. 3 is an exploded view of the sports mat of FIG. 1.

As shown in FIGS. 1 and 3, the sports mat includes a foam sheet 2, an adhesive bonding film 5, a patterned layer 6, two pliable strips 3 and a skid proof layer 7. In this embodiment, the foam sheet 2 is composed of a first foam layer 1 and a second foam layer 4.

Figure 2:
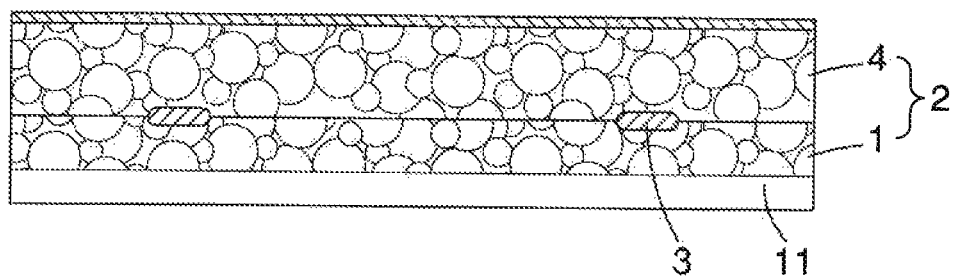
FIG. 2 is a lateral cross-sectional view of the sports mat of FIG. 1.

FIG. 2 illustrates a lateral cross section of the sports mat. The second foam layer 4 of the foam sheet 2 is laminated on a top surface of the first foam layer 1. The two pliable strips 3 are embedded in the foam sheet 2 and each extends along a longitudinal direction of the sports mat. In this embodiment, each of the pliable strips 3 is placed in between the first and second foam layers 1, 4 and parallel with each other.

The foam sheet 2 is made of polyethylene foam and has a density in the range of 2 to 8 pcf and a thickness in the range of 2 to 8 mm. Specifically, the first and second foam layers 1, 4 are both made of polyethylene foam containing an additive of elastic resin. The elastic resin helps to enhance the resilience of the sports mat. Both of the first and second foam layers 1, 4 have a density in the range of 2 to 8 pcf and a total thickness in the range of 2 to 8 mm. Preferably, the density of the foam layers is 4 pcf and the total thickness is 4 mm in order to have the sports mat possess tenderness and great flexibility. However, although the total thickness of the first and the second foam layers 1, 4 is preferably in the range of 2 to 8 mm, the thickness of the first foam layer 1 is not necessary to be the same with that of the second foam layer 4.

Since the first and second foam layers 1, 4 are generally made of the same materials, the second foam layer 4 may be directly bonded to the first foam layer 1 via a heat lamination process without an adhesive or an intermediate layer therebetween.

The sports mat, when in use, may be placed on the floor or the like with the first foam layer 1 contacting the floor. In other appliances, the sports mat may also be applied to serve as a skin for bonding onto an exterior surface of an article, such as a surfboard, to provide appropriate protection.

Referring to FIG. 3, the adhesive bonding film 5 is applied on a top surface of the second foam layer 4 of the foam sheet 2. The patterned layer 6 includes a plastic film 61 and a pattern 62 provided on a bottom surface 611 of the plastic film 61 by means of printing, gilding, embossing, etc. The plastic film 61 together with the pattern 62 is joined on top of the adhesive bonding film 5. In this way, the patterned layer 6 and the foam sheet 2 are bonded together by virtue of the adhesive bonding film 5. Preferably, the thickness of the adhesive bonding film 5 is 0.035 mm. The pattern 62 and the second foam layer 4 of the foam sheet 2 form a contrast in color so that the pattern 62 can be easily distinguished from the second foam layer 4. It is noted that the pattern 62, in this embodiment, is provided on the bottom surface 611 of the plastic film 61; however, in other examples, the pattern (not shown) may be provided on the top surface 610 of the plastic film 61 or on the top surface of the second foam layer 4 of the foam sheet 2.

The skid proof layer 7 is coated on a top surface 610 of the plastic film 61 of the patterned layer 6. Additionally, the plastic film 61 and the skid proof layer 7 are especially transparent or translucent so that the pattern 62 is visible through the plastic film 61 and the skid proof layer 7. Preferably, the thickness of the plastic film 61 is preferably 0.015~0.1 mm and more preferably 0.03 mm. As such, the pattern 62 can be protected from color fading as a result of protection of the plastic film 61. In addition, the pattern 62 with ink is isolated from a user's skin, so that it is safe to a user.

Figure 5:
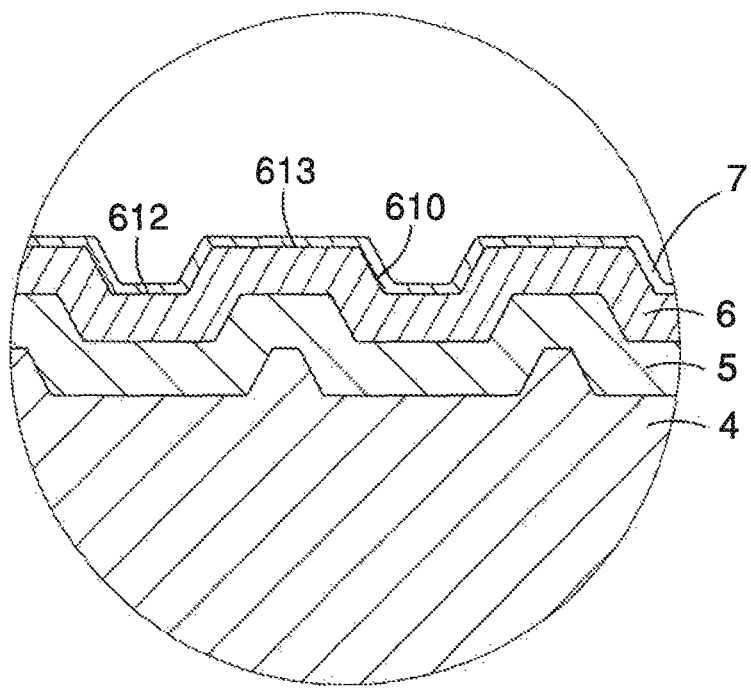
FIG. 5 is a partially enlarged view of FIG. 4.

Referring to FIG. 5, in order to strengthen connection between the patterned layer 6 and the foam sheet 2, the patterned layer 6 together with the adhesive bonding film 5 and the second foam layer 4 of the foam sheet 2 is embossed with irregular patterns to define a plurality of indentations 612 and protrusions 613 over the top surface 610 of the patterned layer 6, as shown in FIG. 5. The indentations 612 and the protrusions 613 may be lines, dots and the like. The skid proof layer 7 has a thickness less than that of the patterned layer 6 and coated on the top surface 610 of the patterned layer 6 and therefore creating the textured structure similar to the patterned layer 6. Thus, the athlete or user is protected from slipping and tumbling. Preferably, the skid proof layer 7 is made of thermal plastic rubber to provide suitable resilience.

Figure 4:
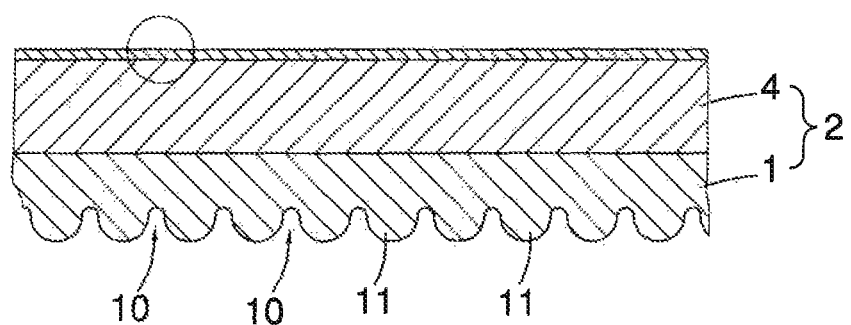
FIG. 4 is a partially, longitudinal cross-sectional view of the sports mat of FIG. 1.
Figure 6:
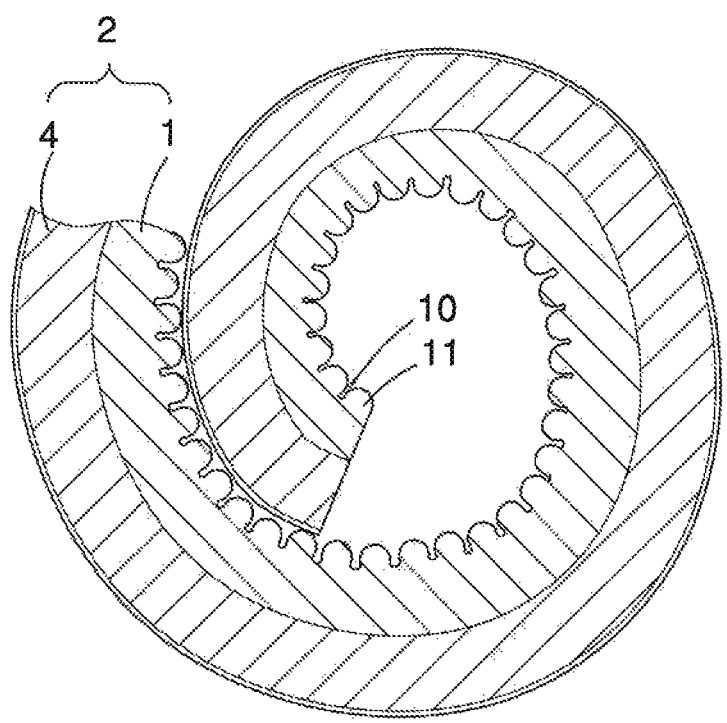
FIG. 6 is a perspective view of the sports mat, showing that the sports mat is rolled up.

As best seen in FIG. 4, the first foam layer 1 of the foam sheet 2 is embossed therebottom with a plurality of elongated ridges 11 separated from one another by valleys 10. Those elongated ridges 11 are parallel with an axis about which the sports mat can be rolled. In practice, the depth of the valleys 10 is preferably about 0.25 to 2 mm, and the interval between two adjacent valleys 10 is preferably 3 mm. Thus, as depicted in FIG. 6, when the sports mat is rolled up, the first foam layer 1 provides rooms, namely the valleys 10, for wresting so that the sports mat won't become shrunk. Preferably, each of the elongated ridges 11 is arch-shaped in cross section. Accordingly, the sports mat can be rolled up easily due to the elongated ridges 11 and the valleys 10. On the other hand, the embedded pliable strips 3 provide a fast unroll function for the rolled sports mat. When the rolled sports mat is untied, the sports mat can be immediately spread up because of the resilience of the pliable strips 3. Moreover, due to the profiling of the elongated ridges 11 and the valleys 10, the sports mat possesses extraordinary flexibility and provides great grip and skid resistance, and combined with good shock absorption.

Preferably, the first foam layer 1 is dark-colored with respect to the second foam layer 4. That is, the first foam layer 1 may be darker than the second foam layer 4. The second foam layer 4 is light-colored in order to serve as a background of the pattern 62 of the patterned layer 6. As such, a variety of colorful patterns with designs or marks may be provided on the sports mat and are more vivid with respect to the light-colored background, namely the second foam layer 4.

Figure 7:
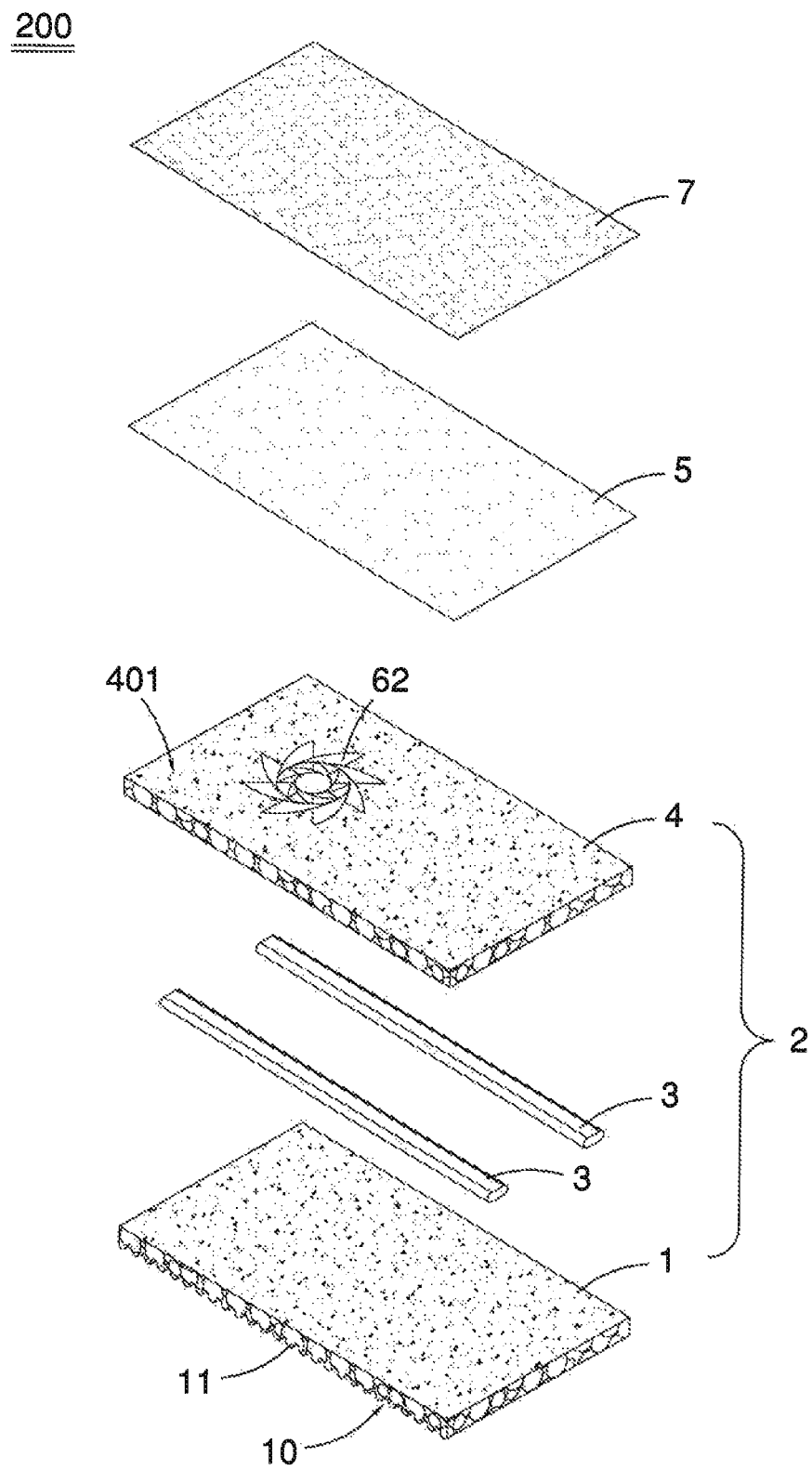
FIG. 7 is an exploded view of a sports mat according to another embodiment of the present invention.

FIG. 7 provides an explosive view of a sports mat in an alternate embodiment. As with the sports mat 100 of FIG. 3, the sports mat 200 of FIG. 7 includes a foam sheet 2 composed of a first foam layer 1 and a second foam layer 4, two pliable strips 3 embedded in the foam sheet 2, an adhesive bonding film 5 and a skid proof layer 7. Substantially all of the elements discussed in the forgoing embodiment on the sports mat 100 apply to this embodiment of sports mat 200. The major difference is that a pattern 62 is directly printed on the second foam layer 4 and plastic films for patterning are excluded in this embodiment.

Briefly, the foam sheet 2 has a density in the range of 2 to 8 pcf and a thickness in the range of 2 to 8 mm. The first foam layer 1 is formed therebottom with a plurality of elongated ridges 11 parallel to one another and separated by valleys 10. The second foam layer 4 is laminated to a top surface of the first foam layer 1. The first and second foam layers 1, 4 are both made of polyethylene foam containing an additive of elastic resin. The pliable strips 3 is arch-shaped in cross section and extends along a longitudinal direction of the sports mat and placed in between the first and second foam layers 1, 4 of the foam sheet 2.

The pattern 62 which is printed in a top surface 401 of the second foam layer 4, is also visible from outside of the sports mat. Preferably, the pattern 62 and the second foam layer 4 form a contrast in color, as described in the aforementioned embodiment. The adhesive bonding film 5 is applied on the top surface 401 of the patterned foam sheet 4. The skid proof layer 7 is applied on top of the adhesive bonding film 5 and made of thermal plastic rubber.

As stated above, the sports mat of the present invention satisfies the desire of beauty as well as the needs of comfort, safety and high elasticity.

Numerous characteristics and advantages of the invention have been set forth in the foregoing description. The disclosure, however, is illustrative only, and changes may be made in detail within the principle of the invention, to the full extent indicated by the broad general meaning of the terms in which the appended claims are expressed.

The invention claimed is:

1. A laminated object comprising:
   a first foam layer;
   a second foam layer laminated to a top surface of the first foam layer; and
   an embedment embedded between the first foam layer and the second foam layer, the embedment having a top surface, a bottom surface, a front end surface and a rear end surface, the entire top surface of the embedment contacting with a bottom surface of the second foam layer, the entire bottom surface of the embedment contacting with the top surface of the first foam layer, the front end surface of the embedment exposing a front end surface of the first foam layer and a front end surface of the second foam layer, and the rear end surface of the embedment exposing a rear end surface of the first foam layer and a rear end surface of the second foam layer.

2. The laminated object of claim 1 wherein the first foam layer and the second foam layer are made of polyethylene foam.

3. The laminated object of claim 2 wherein a destiny of the first foam layer and the second foam layer is in the range of 2 to 8 pcf, a total thickness of the first foam layer and the second foam layer is in the range of 2 to 8 mm.

4. The laminated object of claim 1 further comprising a cover coated over a top surface of the second foam layer.

5. The laminated object of claim 4 wherein the cover consists of a plurality layers, and one of the layers is a plastic film.

6. The laminated object of claim 1 wherein the embedment is pliable.

* * * * *